March 14, 1967 A. FISCHER 3,308,585
DEVICE FOR BONDING EXPANSION ANCHOR
SLEEVES IN MASONRY OR THE LIKE
Filed April 13, 1964
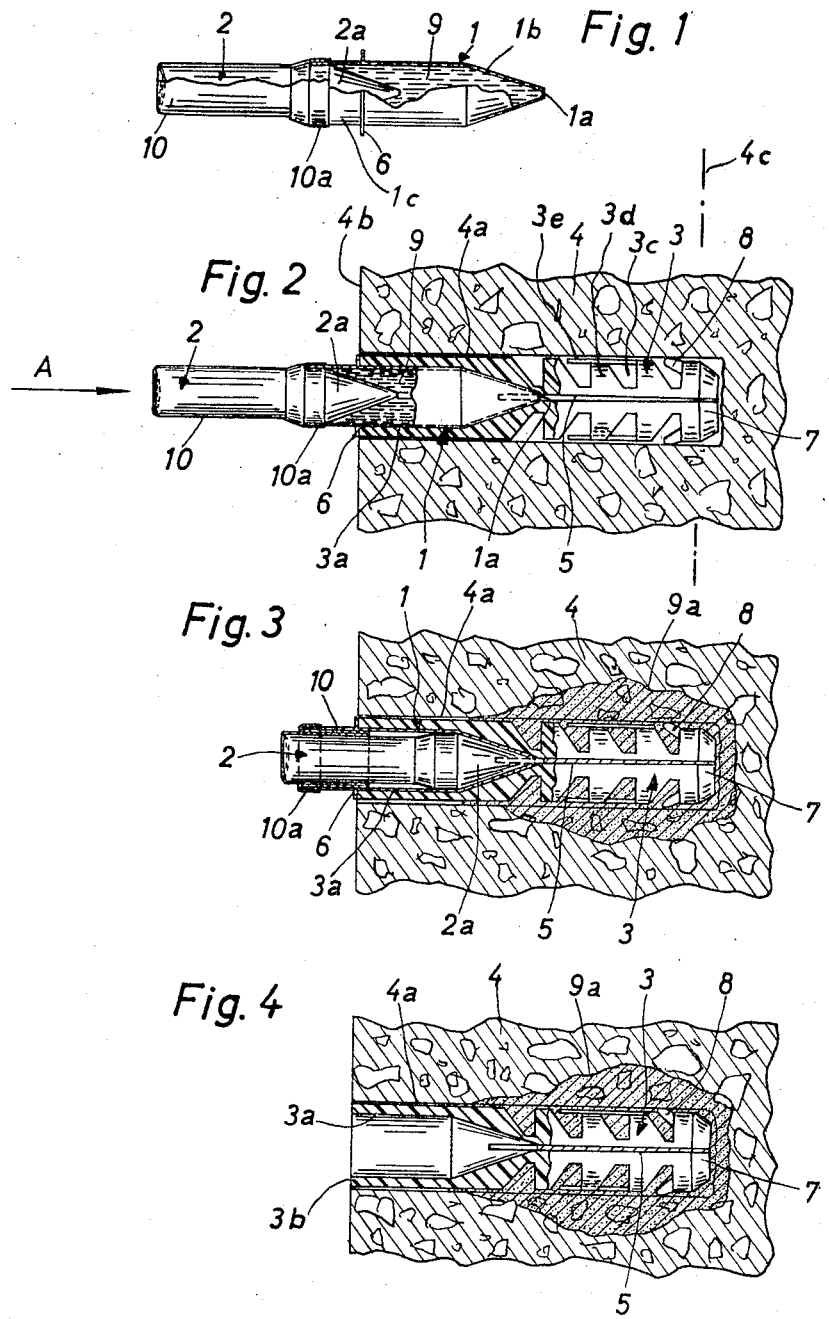
INVENTOR.
ARTUR FISCHER
BY
MICHAEL S STRIKER United States Patent Office 3,308,585
Patented Mar. 14, 1967

3,308,585
DEVICE FOR BONDING EXPANSION ANCHOR SLEEVES IN MASONRY OR THE LIKE
Artur Fischer, Tumlingen, Kreis Freudenstadt, Germany
Filed Apr. 13, 1964, Ser. No. 359,179
Claims priority, application Germany, Apr. 11, 1963, F 39,475
17 Claims. (Cl. 52—98)

The present invention relates to expansion anchors in general, and more particularly to an improved device which serves to bond slotted expansion anchor sleeves in expansion anchor holes of masonry walls or similar supporting structures.

It is an important object of the invention to provide a very simple and inexpensive device which may be utilized to discharge requisite quantities of adhesive into the material surrounding an expansion anchor hole and which is constructed in such a way that all of the adhesive will be discharged in the desired direction or directions.

Another object of the invention is to provide a device of the just-outlined characteristics which may be put to use with the help of very simple tools, which is capable of discharging adhesive around such parts of an expansion anchor sleeve which are most likely to be subjected to substantial axial or angular stresses when the sleeve receives a dowel, a bolt, a screw or a similar fastener, and which may be emptied by exertion of comparatively small forces to discharge a requisite supply of adhesive in one or more desired directions.

A further object of the invention is to provide a device for bonding synthetic plastic expansion anchor sleeves to comparatively brittle and porous supporting structures, and to construct the device in such a way that its parts may be removed and discarded once the adhesive is dispensed so that the thus bonded expansion anchor sleeve is ready to receive a bolt, a screw, a dowel or a similar fastener.

A concomitant object of the invention is to provide an expendable device of the above-outlined characteristics and to construct the device as a one-piece unit which occupies little room in storage or shipment, which need not be produced with utmost precision, and which protects its charge of adhesive from contact with the surrounding atmosphere so that the adhesive remains in optimum condition and is always ready for immediate use.

Still another object of the invention is to provide a specially constructed and dimensioned expansion anchor sleeve which may be used in connection with the improved bonding device.

A further object of the invention is to provide an expansion anchor sleeve which is capable of cooperating with my bonding device in such a way that the charge of adhesive will be automatically directed to such areas of the sleeve and of the surrounding material of the supporting structure to insure the formation of an optimum bond between the sleeve and such material.

With the above objects in view, one feature of my invention resides in the provision of a device for bonding slotted expansion anchor sleeves in expansion anchor holes provided in masonry or in similar supporting structures. The device comprises an adhesive-filled container arranged to be inserted in a slotted expansion anchor sleeve upon introduction of such sleeve in an expansion anchor hole, and a plunger which is preferably connected to and then forms with the container a one-piece insert or cartridge. The plunger may be driven into the container, for example, by using a hammer or the like, to cause controlled expulsion of adhesive through the slot or slots of the sleeve and into the surrounding material of the supporting structure so that such adhesive may harden and then bonds the sleeve to the supporting structure. The thus anchored sleeve is then ready to receive a fastener as soon as the container is removed from its interior.

The novel features which are considered as characteristic of the invention are set forth in particular in the appended claims. The improved bonding device itself, however, both as to its construction and the mode of using the same, together with additional features and advantages thereof, will be best understood upon perusal of the following detailed description of a specific embodiment with reference to the accompanying drawings, in which:

FIG. 1 is a side elevational view of a bonding device which embodies my invention, a portion of the container being broken away to show that the container is filled with liquid or liquefied adhesive;

FIG. 2 is an axial section through a slotted expansion anchor sleeve which is received in a hole provided in a masonry wall, and further illustrates the bonding device in FIG. 1 in a position in which the leading portion of the container extends snugly into the internal space of the sleeve;

FIG. 3 illustrates the bonding device in a position its parts assume when the adhesive is expelled from the container; and FIG. 4 illustrates the sleeve upon withdrawal of the bonding device when the sleeve is ready to take a dowel or a threaded fastener.

Referring first to FIG. 1, the bonding device of my invention comprises a container 1 including a thin-walled shell or mantle of flexible synthetic thermoplastic material. This container is provided with a conical leading portion 1b terminating in a tip 1a, and with a trailing portion 1c which receives the leading end or cone 2a of a plunger 2. The tip 1a may be weaker than the remainder of the plastic shell or, alternatively, this tip may be provided with an orifice containing a plug of dried adhesive 9 which fills the interior of the container 1. When the cone 2a of the plunger 2 penetrates into the leading portion 1b of the container 1, the pressure of adhesive overcomes the sealing action of the dried plug in the tip 1a so that the container discharges a jet of adhesive which passes through the radial slot 5 of a specially configurated expansion anchor sleeve 3 shown in FIGS. 2 to 4. It is further to be noted that the trailing portion 1c of the container is provided with a reflux or backflow eliminating collar 6 whose diameter exceeds the internal diameter of the sleeve 3 and which may act as a stop (see FIG. 2) to indicate when the bonding device is properly inserted in the sleeve so that the plunger 2 may be driven home.

The plunger 2 is surrounded by a thin film 10 of flexible thermoplastic web material whose open end portion 10a is welded to the trailing portion 1c of the container 1 to make sure that there is no uncontrolled escape of adhesive. The plunger 2 may consist of metallic or rigid synthetic plastic and its cone 2a may fill the leading portion 1b to make sure that the plunger will expel all of the adhesive.

Referring to FIG. 2, the sleeve 3 is received in an expansion anchor hole 4a drilled in the exposed side 4b of a masonry wall 4 or a similar brittle and porous supporting structure. The length of the hole 4a approximates the axial length of the sleeve 3 so that the left-hand end face 3b of the sleeve is flush or substantially coplanar with the exposed side 4b. The sleeve consists of flexible synthetic plastic material and is provided with an axially extending slot 5 beginning at its leading end portion 7 and terminating short of the end face 3b. Thus, the slot 5 actually includes two radial slots which may discharge adhesive when the container 1 is emptied while being accommodated in the internal conical space 3a of the sleeve 3. The periphery of the sleeve is provided with cutouts 3c to form substantially radially extending teeth 3d having axial projections 3e which prevent or hinder rotation of the sleeve with reference to the masonry wall 4. The outline of the space 3a resembles the leading portion 1b and this space is dimensioned in such a way that it may receive the entire leading portion 1b at which time the collar 6 comes in abutment with the end face 3b. This indicates to the operator that he must resort to a hammer or to finger pressure in order to drive the plunger 2 into the space 3a (see the arrow A in FIG. 2) until the plunger reaches the position of FIG. 3 in which the container is empty because the supply of adhesive 9 has been expelled through the tip 1a and through the slot 5 to penetrate into surrounding material of the masonry wall 4. That zone of the wall 4 which is permeated with adhesive is indicated in FIGS. 3 and 4 by cross-hatching and is identified by the numeral 9a. The material of the container's shell is preferably sufficiently rigid to retain its form at the time the plunger 2 is caused to advance from the position of FIG. 2 to that of FIG. 3. Thus, the leading portion 1b will actually guide the cone 2a on its way to the position of FIG. 3. It will be noted that the material of the film 10 is more flexible so that this film is caused to bend over itself while the collar 6 remains in abutment with the left-hand end face 3b of the sleeve 3. The cone 2a at the leading end of the plunger 2 will readily destroy the seal at the tip 1a of the container 1 so that the leading portion 1b of the container will act not unlike a nozzle and will direct a jet of adhesive through the thus formed orifice and into the slot 5 whence the adhesive travels radially outwardly to penetrate into the material of the wall structure 4.

In accordance with a preferred embodiment of my invention, the sleeve 3 is dimensioned in such a way that its leading end portion 7 is compressed in response to engagement of suitable projections 8 with the surface surrounding the expansion anchor hole 4a whereby the jet of adhesive issuing through the tip 1a is prevented from advancing axially and is compelled to travel radially outwardly to insure that the entire peripheral surface of the sleeve will be bonded to the material of the wall structure. The bond between the sleeve 3 and the wall structure 4 is much stronger if the adhesive forms a series of radial jets. If desired, the sleeve may be slotted in criss-cross fashion to insure even better distribution of adhesive in the material which surrounds the expansion anchor hole 4a.

The adhesive 9 is preferably a substance which forms a somewhat elastic layer around the periphery of the sleeve 3 and in the cutouts 3c between the teeth 3d. This insures that the adhesive will not promote crumbling of brittle material, particularly if the wall structure 4 and/or the sleeve 3 will be caused to vibrate. In other words, I prefer to utilize an adhesive which will not form a rigid mass but will retain some elasticity to participate in vibrations or other types of movements which might lead to crumbling of the wall structure if the adhesive is of plastic which, on setting thereof, forms a rigid body.

A very important advantage of the feature that the sleeve 3 is provided with projections 8 which prevent axial discharge of adhesive is that the sleeve may be used in supporting structures whose thickness equals or is even less than the axial length of the sleeve. Thus, and assuming that the wall structure 4 of FIGS. 2 to 4 would have a right-hand side face 4c extending along the phantom line shown in FIG. 2, the charge of adhesive which is being evacuated from the container 1 would still suffice to bond the sleeve in the hole 4a because the leading end portion 7 of the sleeve would cause the major part of adhesive to escape radially and to permeate the wall structure around the expansion anchor hole. It will be noted that the end portion 7 need not come in actual contact with the material of the wall structure as long as the projections 8 insure that the front end of the slot 5 is closed or that the width of this slot is reduced sufficiently to prevent excessive axial discharge of adhesive when the plunger 2 is driven into the leading portion 1b.

The provision of a plunger which is integral with or is connected to the container 1 is of considerable advantage because the plunger may be readily withdrawn once the supply of adhesive is expelled from the interior of the container. Certain presently used devices of this general character are without a plunger and discharge adhesive in response to insertion of a dowel or a threaded fastener. Such types of anchoring structures are inferior since the fastener might adhere too strongly to the sleeve and cannot be removed from the space 3a, and also because the fastener is not in direct engagement with the sleeve but rather with the shell of the container which remains in the sleeve.

The basic purpose of the adhesive layer 9a is to fill in the pores in brittle supporting structures so as to provide a stronger retaining action and to prevent uncontrolled rotation or extraction of the sleeve. Any suitable adhesive which sets to form a satisfactory reinforcing and filling layer can be used in the container 1, such as dispersions and solutions.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An expandable device for bonding slotted expansion anchor sleeves in expansion anchor holes provided in masonry and similar supporting structures, comprising an adhesive-containing container including a leading portion arranged to be inserted into and to substantially fill a slotted expansion anchor sleeve upon introduction of such sleeve into an expansion anchor hole, said container further including a trailing portion; annular reflux eliminating means having an outer diameter larger than the inner diameter of said sleeve and arranged rearwardly of said leading portion so as to engage the inner surface of said sleeve during insertion of said leading portion of said container into said sleeve; and a plunger secured to the trailing portion of said container and arranged to be driven into said leading portion so as to expel adhesive through the slotted sleeve and into the surrounding material of the supporting structure whereby such adhesive bonds the sleeve to the supporting structure, while said annular reflux eliminating means prevent the expelled adhesive to be forced out of said sleeve.

2. An expandable device for bonding slotted expansion anchor sleeves in expansion anchor holes provided in masonry and similar supporting structures, comprising an adhesive-containing container including a leading portion arranged to be inserted into and to substantially fill a slotted expansion anchor sleeve upon introduction of such sleeve into an expansion anchor hole, said container further including a trailing portion; annular reflux eliminating means having an outer diameter larger than the inner diameter of said sleeve and arranged rearwardly of said leading portion so as to engage the inner surface of said sleeve during insertion of said leading portion of said container into said sleeve; and a plunger sealingly secured to the trailing portion of said container and arranged to be driven into said leading portion so as to expel adhesive through the slotted sleeve and into the surrounding material of the supporting structure whereby such adhesive bonds the sleeve to the supporting structure, while said annular reflux eliminating means prevent the expelled adhesive to be forced out of said sleeve.

3. An expendable device for bonding slotted expansion anchor sleeves in expansion anchor holes provided in masonry and similar supporting structures, comprising an adhesive-containing container including a leading portion arranged to be inserted into and to substantially fill a slotted expansion anchor sleeve upon introduction of such sleeve into an expansion anchor hole, said container further including a trailing portion; a plunger adjacent to the trailing portion of said container and arranged to be driven into said leading portion so as to expel adhesive through the slotted sleeve and into the surrounding material of the supporting structure whereby such adhesive bonds the sleeve to the supporting structure; and a film of flexible wrapper material surrounding said plunger and secured to the trailing portion of said container.

4. A device as set forth in claim 3, wherein said container and said film consist of synthetic plastic material and wherein said film is welded to said trailing portion.

5. An expendable device for bonding slotted expansion anchor sleeves in expansion anchor holes provided in masonry and similar supporting structures, comprising an adhesive-containing container including a leading portion arranged to be inserted into and to substantially fill a slotted expansion anchor sleeve upon introduction of such sleeve into an expansion anchor hole, said container further including a trailing portion; annular reflux eliminating means having an outer diameter larger than the inner diameter of said sleeve and arranged rearwardly of said leading portion so as to engage the inner surface of said sleeve during insertion of said leading portion of said container into said sleeve; and a plunger secured to the trailing portion of said container and arranged to be driven into said leading portion so as to expel adhesive through the slotted sleeve and into the surrounding material of the supporting structure whereby such adhesive bonds the sleeve to the supporting structure, said plunger and said container forming a unit wherein the leading portion of said container guides the plunger when the latter is forced into the slotted sleeve, while said annular reflux eliminating means prevent the expelled adhesive to be forced out of said sleeve.

6. A device for bonding slotted open-ended expansion anchor sleeves in expansion anchor holes provided in masonry and similar supporting structures, comprising a container including a thin-walled adhesive-containing shell having a leading portion arranged to be inserted into a slotted expansion anchor sleeve upon introduction of such sleeve into an expansion anchor hole, said shell further comprising a trailing portion provided in the rear portion of said container with reflux eliminating means engaging the open end of the sleeve when the leading portion of said shell is inserted into the sleeve; and a plunger sealingly secured to the trailing portion of said shell and arranged to be driven into said leading portion to expel adhesive through the slotted sleeve and into the surrounding material of the supporting structure so that such adhesive bonds the sleeve to the supporting structure.

7. A device as set forth in claim 6, wherein said reflux eliminating means comprises a collar provided on said shell and having a maximum diameter exceeding the internal diameter of the sleeve.

8. In a supporting structure having an exposed side and an expansion anchor hole extending inwardly from said open side thereof, in combination, a deformable expansion anchor sleeve received in the hole of said supporting structure and having a leading portion and a slot extending from said leading portion toward but short of the other end thereof; and an expendable bonding device including an adhesive-containing container received in and substantially filling the interior of said sleeve, said container having a leading portion provided with a weakened spot which may be destroyed in response to increasing pressure of adhesive so that the adhesive may penetrate into the slot of said sleeve and thereupon into the material surrounding said hole, and a plunger secured to said container and arranged to be driven into said leading portion thereof to destroy said weakened spot and to cause expulsion of adhesive into the material of the supporting structure to bond said sleeve thereto, whereupon said device may be withdrawn from the sleeve so that the latter may receive a fastener.

9. A combination as set forth in claim 8, wherein said sleeve defines a conical internal space and wherein said leading portion is dimensioned to fill said internal space prior to evacuation of adhesive.

10. A combination as set forth in claim 9, wherein said sleeve is provided with an end face at said other end thereof and wherein said container comprises a collar which abuts against said end face to prevent backflow of adhesive when said container fills said internal space and when the plunger is driven into said leading portion.

11. A combination as set forth in claim 9, wherein said plunger comprises a conical head which completely fills said leading portion when the adhesive is expelled from said container.

12. A combination as set forth in claim 8, wherein said container comprises a thin shell of synthetic thermoplastic material and wherein said adhesive is a material which, after setting, forms a strong bond with the material of said sleeve.

13. A combination as set forth in claim 8, and further comprising a film of flexible wrapper material surrounding said plunger and secured to said container rearwardly of said leading portion.

14. For use in a supporting structure having an exposed side and an expansion anchor hole extending inwardly from said open side thereof, an anchoring arrangement comprising, in combination, a deformable expansion anchor sleeve received in the hole of said supporting structure and having a leading portion and a slot extending from said leading portion toward but short of the other end thereof; and an expendable bonding device including an adhesive-containing container arranged in the interior of said sleeve and having a portion which may be ruptured in response to increasing pressure of adhesive within said container so that the adhesive may penetrate into the slot of said sleeve and thereupon into the material surrounding said hole, and a plunger secured to said container and arranged to be driven into said sleeve so as to rupture said portion of said container and to cause expulsion of adhesive through said slot in said sleeve into the material of the supporting structure to bond said sleeve thereto whereupon said expendable bonding device may be withdrawn from said sleeve so that the latter may receive a fastener.

15. An anchoring arrangement according to claim 14, wherein said container has a weakened portion at the leading end thereof.

16. An anchoring arrangement according to claim 14, wherein said plunger is secured to the rear end of said container.

17. An anchoring arrangement according to claim 14, wherein said container is provided with a deformable collar near the rear end thereof, which collar has a diameter at least as great as the inner diameter of said sleeve.

References Cited by the Examiner

UNITED STATES PATENTS

| | | | |
|---|---|---|---|
| 2,351,449 | 6/1944 | Noble | 52—707 X |
| 2,358,998 | 9/1944 | Radbruch | 222—386 X |
| 2,695,735 | 11/1954 | Van Doorinik | 222—386 |

FOREIGN PATENTS

| | | |
|---|---|---|
| 265,407 | 2/1927 | Great Britain. |
| 1,102,375 | 3/1961 | Germany. |
| 99,818 | 4/1962 | Norway. |

FRANK L. ABBOTT, *Primary Examiner.*

M. O. WARNECKE, *Assistant Examiner.*